United States Patent
Lin et al.

(10) Patent No.: US 11,543,901 B2
(45) Date of Patent: Jan. 3, 2023

(54) TOUCH CONTROL DEVICE AND STYLUS THEREOF

(71) Applicant: ILI TECHNOLOGY CORP., Hsinchu County (TW)

(72) Inventors: Yifan Lin, Hsinchu County (TW); Chia-Yu Hung, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 17/520,619

(22) Filed: Nov. 5, 2021

(65) Prior Publication Data
US 2022/0276727 A1 Sep. 1, 2022

(30) Foreign Application Priority Data
Feb. 26, 2021 (TW) .................................. 110106928

(51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/04162* (2019.05)

(58) Field of Classification Search
CPC ............... G06F 3/0383; G06F 3/04162; G06F 3/03545; G06F 3/041–0488
See application file for complete search history.

(56) References Cited

U.S. PATENT DOCUMENTS

| | | | |
|---|---|---|---|
| 9,495,024 B2 | 11/2016 | Watanabe | |
| 9,652,058 B2 | 5/2017 | Watanabe | |
| 10,078,379 B2 | 9/2018 | Watanabe | |
| 10,466,816 B2 | 11/2019 | Watanabe | |
| 10,474,280 B2 | 11/2019 | Jang et al. | |
| 10,860,119 B2 | 12/2020 | Watanabe | |
| 2015/0049052 A1* | 2/2015 | Atkinson | G06F 3/04162 345/174 |
| 2016/0306444 A1* | 10/2016 | Fleck | G06F 9/4411 |
| 2017/0192591 A1* | 7/2017 | Jang | G06F 3/03545 |
| 2017/0344174 A1* | 11/2017 | Pant | G06F 3/041661 |

FOREIGN PATENT DOCUMENTS

| | | |
|---|---|---|
| CN | 108287640 | 7/2018 |
| CN | 109791445 | 5/2019 |
| CN | 111448538 | 7/2020 |
| TW | 201704938 | 2/2017 |
| TW | 201807554 | 3/2018 |
| TW | M599415 | 8/2020 |

* cited by examiner

*Primary Examiner* — Temesghen Ghebretinsae
*Assistant Examiner* — Ivelisse Martinez Quiles
(74) *Attorney, Agent, or Firm* — JCIPRNET

(57) ABSTRACT

A touch control device and a stylus are provided. The stylus includes a transceiver and a controller. The controller generates a plurality of data items based on a request signal received by the transceiver, and generates at least one status data signal in each data item according to at least one operation status of the stylus. In particular, the controller makes the transceiver select at least one selected time period in a plurality of first time periods to transmit the at least one status data signal to a host and transmit at least one normal data signal in at least one other time period other than the at least one selected time period. In particular, a frequency of the at least one status data signal is different from a frequency of the at least one normal data signal.

12 Claims, 4 Drawing Sheets

TOUCH CONTROL DEVICE AND STYLUS THEREOF

CROSS-REFERENCE TO RELATED APPLICATION

This application claims the priority benefit of Taiwanese application no. 110106928, filed on Feb. 26, 2021. The entirety of the above-mentioned patent application is hereby incorporated by reference herein and made a part of this specification.

BACKGROUND OF THE INVENTION

Field of the Invention

The invention relates to a touch control device and a stylus thereof, and more particularly to a touch control device and a stylus thereof that may effectively improve the transmission efficiency of related information about the operation status of the stylus.

Description of Related Art

In today's touch control techniques, it has become a major trend to provide an active stylus to perform touch control operations on electronic devices.

In the conventional technical field, the stylus may transmit the operation status of the stylus to the host via a fixed frequency at a different phase difference in a plurality of data items, with a plurality of bit digital values. The host needs to decode the complete data packet of the data items to correctly learn the operation status of the stylus.

In other words, in the conventional touch control device, the host may not learn the operation status of the stylus in the shortest time possible. Therefore, the host may not quickly respond to the operation status of the stylus, thus lowering the user's fluency in use.

SUMMARY OF THE INVENTION

The invention provides a touch control device and a stylus thereof that can effectively improve the transmission efficiency of related information about the operation status of the stylus.

A stylus of the invention includes a transceiver and a controller. The controller is coupled to the transceiver. The controller generates a plurality of data items based on a request signal received by the transceiver, and generates at least one status data signal in each data item according to at least one operation status of the stylus. In particular, the controller makes the transceiver select at least one selected time period in a plurality of first time periods to transmit the at least one status data signal to a host and transmit at least one normal data signal in at least one other time period other than the at least one selected time period. In particular, a frequency of the at least one status data signal is different from a frequency of the at least one normal data signal.

A touch control device of the invention includes the above stylus and a host. The host transmits a request signal, receives a data item, and receives at least one status data signal in a selected item; and detects a frequency and a phase of the at least one status data signal to learn at least one operation status of the stylus.

Based on the above, in an embodiment of the invention, the stylus sets the status data signal indicating the operation status in any one or a plurality of time periods in a data item to be transmitted at a different frequency from the normal data signal. In this way, when the host receives status data signals with different frequencies, the host may immediately learn the operation status of the stylus by detecting the phase of the status data signal, so as to increase the response speed of the host needed to respond to the operation status of the stylus.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
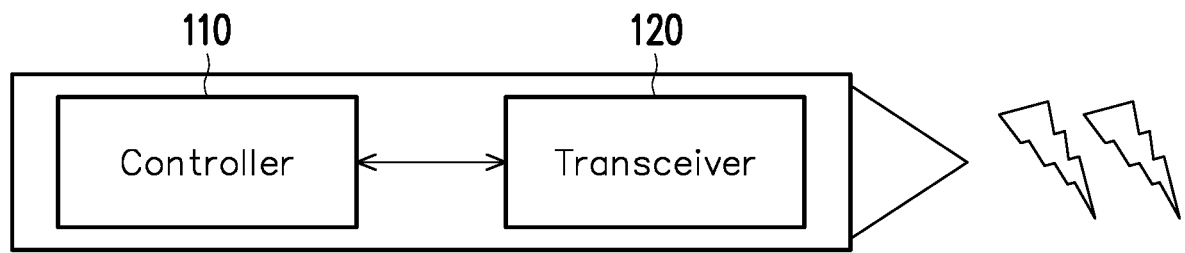
FIG. 1 shows a schematic diagram of a stylus of an embodiment of the invention.

Please refer to FIG. 1. FIG. 1 shows a schematic diagram of a stylus of an embodiment of the invention. A stylus 100 includes a controller 110 and a transceiver 120. The controller 110 is coupled to the transceiver 120. The controller 110 may generate a plurality of data items based on a request signal received by the transceiver 120. Moreover, in a selected item of the data item, the controller 110 may generate at least one status data signal according to at least one operation status of the stylus.

Figure 2:
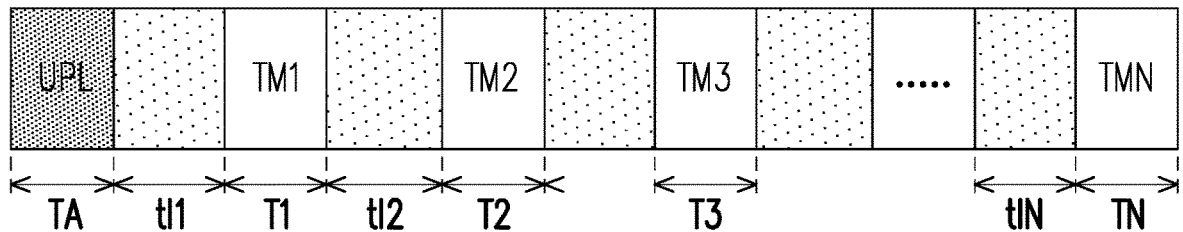
FIG. 2 shows a schematic diagram of the signal transceiving status of a stylus 100 of the embodiment of FIG. 1 of the invention.

Please refer to FIG. 1 and FIG. 2 simultaneously. FIG. 2 shows a schematic diagram of the signal transceiving status of the stylus 100 of the embodiment of FIG. 1 of the invention. The stylus 100 may receive a request signal UPL transmitted by the host in a time TA via the transceiver 120. Then, the stylus 100 may respectively transmit a plurality of data items TM1 to TMN at a plurality of consecutive times T1 to TN based on the request signal UPL. In particular, there is a time period tI1 to tIN between the transmission times T1 to TN corresponding to every two adjacent data items TM1 to TMN.

Moreover, the controller 110 generates one or a plurality of corresponding status data signals according to one or a plurality of operation statuses of the stylus 100. The controller 110 may transmit the generated status data signal in each of the data items TM1 to TMN. Or, a portion of the data items TM1 to TMN is configured to transmit status data signals.

Figure 3A:
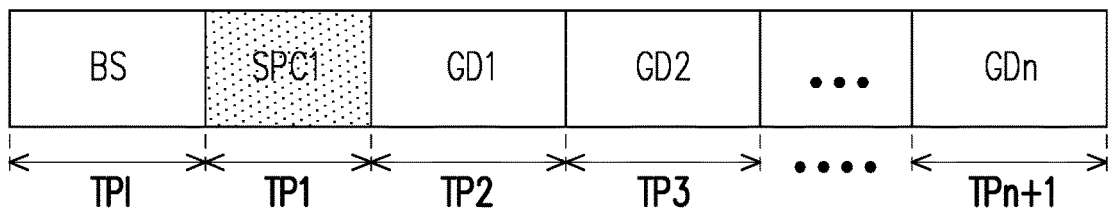
FIG. 3A shows a schematic diagram of a transmission method of the status data signal of the stylus 100 of the embodiment of FIG. 1 of the invention.

Please refer to FIG. 1 and FIG. 3A together in the following. FIG. 3A shows a schematic diagram of a transmission method of the status data signal of the stylus 100 of the embodiment of FIG. 1 of the invention. In FIG. 3A, taking the data item TM1 as an example, the controller 110 may transmit a reference signal BS in a time period TPI in the data item TM1 via the transceiver 120, and sequentially transmit a status data signal SPC1 and a plurality of normal data signals GD1 to GDn in a plurality of time periods TP1 to TPn+1 after the time period TPI. In particular, the length of the time period TPI may be the same as any of the time periods TP2 to TPn+1. In the present embodiment, the status data signal SPC1 may be configured to indicate at least one of a hover status, an ink status, a button pressing status, and a power status of the stylus, or other stylus information and other stylus status changes.

It should be mentioned that, the operation status of the stylus 100 corresponding to the status data signal in an embodiment of the invention may be set by the designer, and is not limited to the plurality of statuses described above. As the functions provided by the stylus 100 become more complex, the designer may set more different specific operation statuses of the stylus 100 and generate corresponding status data signals accordingly.

It should be mentioned that, in order to distinguish the status data signal SPC1 from the normal data signals GD1 to GDn, the controller 110 may make the frequency of the generated status data signal SPC1 different from the frequency of each of the normal data signals GD1 to GDn. In particular, the frequency of the status data signal SPC1 may be higher than the frequency of each of the normal data signals GD1 to GDn. Alternatively, the frequency of the status data signal SPC1 may be lower than the frequency of each of the normal data signals GD1 to GDn. Here, the frequency of the status data signal SPC1 may also be zero. In other words, the status data signal SPC1 may also be a DC voltage.

It should be mentioned that, in the present embodiment, the frequency of the reference signal BS may be the same as the frequency of each of the normal data signals GD1 to GDn. In particular, the reference signal BS may be a periodic signal providing a reference phase, and each of the normal data signals GD1 to GDn may have the same or different phase as the reference signal BS. The controller 110 may express the digital value of the normal data signals GD1 to GDn via the phase difference between each of the normal data signals GD1 to GDn and the reference signal BS.

In the present embodiment, the normal data signals GD1 to GDn may use digital or non-digital values to indicate at least one of, for example, position information, stroke pressure value, pen grip strength value, coordinate information, button status, interrupt signal, tilt angle, acceleration information, retained data, and stylus recognition information of the stylus 100.

Moreover, in an embodiment of the invention, the time length of the time period TP1 for transmitting the status data signal SPC1 does not need to be related to the frequency of the status data signal SPC1. In implementation, the time length of the time period TP1 corresponding to the status data signal SPC1 may be longer, equal to, or shorter than the time length of the time period TP2 for transmitting the normal data signal (such as the data signal GD1), and there is no particular limit.

Figure 3B:
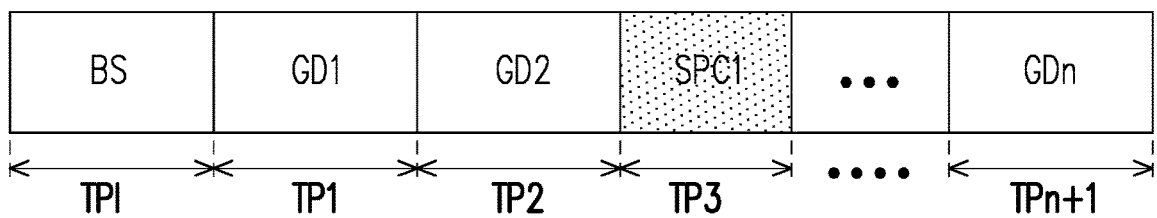
FIG. 3B and FIG. 3C show schematic diagrams of a plurality of different transmission methods of the status data signal of the stylus 100 of the embodiment of FIG. 1 of the invention.
Figure 3C:
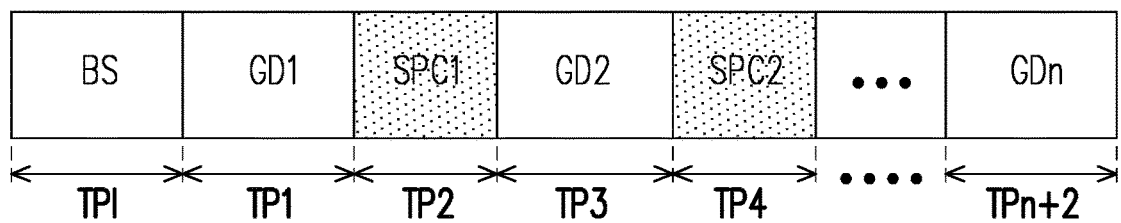

Please refer to FIG. 1, FIG. 3B, and FIG. 3C together in the following. FIG. 3B and FIG. 3C show a schematic diagram of a plurality of different transmission methods of the status data signal of the stylus 100 of the embodiment of FIG. 1 of the invention. In FIG. 3B, the status data signal SPC1 may not be limited to be transmitted in the time period TP1, and may also be transmitted in the time period TP3. In other words, in an embodiment of the invention, the normal data signals GD1 to GDn do not need to be transmitted in a plurality of consecutive time periods. The status data signal SPC1 may also be inserted between a plurality of normal data signals GD1 to GDn and transmitted in sequence.

Moreover, in FIG. 3C, in one data item (such as the data item TM1), a plurality of status data signals SPC1 and SPC2 may also be transmitted. In particular, the status data signals SPC1 and SPC2 and the normal data signals GD1 to GDn may be transmitted in the time periods TP1 to TPn+2. In particular, the status data signals SPC1 and SPC2 may be transmitted in discontinuous time periods TP2 and TP4, respectively. Or, in other embodiments of the invention, the status data signals SPC1 and SPC2 may also be transmitted in any two consecutive time periods without a certain limit.

In the present embodiment, the status data signals SPC1 and SPC2 may respectively correspond to two different operation statuses of the stylus 100. In addition, the status data signals SPC1 and SPC2 may have different frequencies to correspond to different operation statuses. Or, the status data signals SPC1 and SPC2 may have the same frequency but different phases, and may also effectively indicate two different operation statuses of the stylus 100.

In the present embodiment, the controller 110 may be designed by a hardware description language (HDL) or any other design method of a digital circuit known to those having ordinary skill in the art, and is a hardware circuit implemented by a field-programmable gate array (FPGA), complex programmable logic device (CPLD), or application-specific integrated circuit (ASIC). The controller 110 may be a processor with computing capability, implemented by executing a firmware program. Alternatively, the controller 110 may also be constructed using an analog circuit. The transceiver 120 may be implemented by a transceiving circuit known to those with ordinary skill in the art.

Figure 4A:
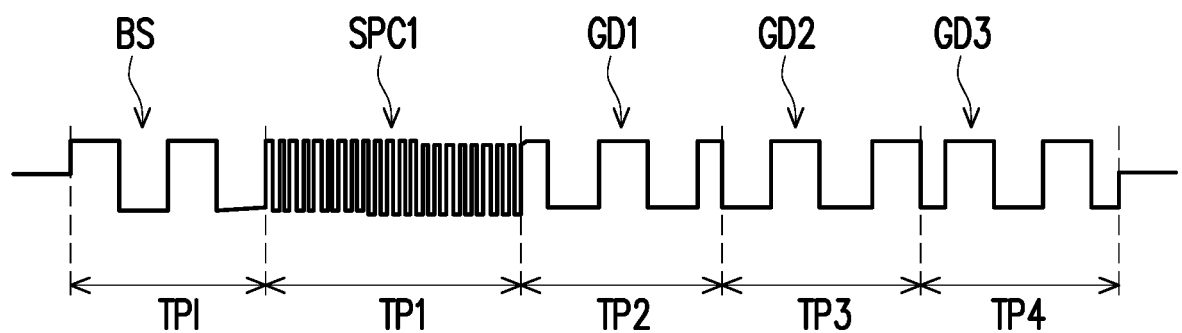
FIG. 4A and FIG. 4B respectively show waveform diagrams of signals transmitted by a stylus operation of an embodiment of the invention.
Figure 4B:
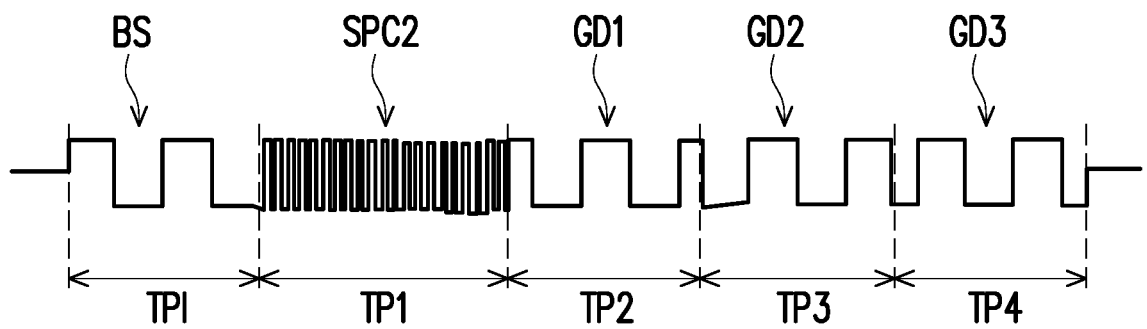

Please refer to FIG. 4A and FIG. 4B in the following. FIG. 4A and FIG. 4B respectively show waveform diagrams of signals transmitted by a stylus operation of an embodiment of the invention. In FIG. 4A, in a data item, the stylus may transmit the reference signal BS in the time period TPI, wherein the reference signal BS is a periodic signal and may have a first frequency and a first phase. In the time period TP1 after the time period TPI, the stylus may transmit the status data signal SPC1, wherein the status data signal SPC1 is also a periodic signal and has a second frequency. In the present embodiment, the first frequency is lower than the second frequency. In the present embodiment, the status data signal SPC1 with a relatively high second frequency may be configured to indicate that the stylus is in a hover status. In other embodiments of the invention, the status data signal SPC1 may also be a signal with a relatively low frequency (lower than the first frequency), or the status data signal SPC1 may also be a DC voltage. Here, the status data signal SPC1 may be a DC voltage (with a frequency of 0 Hz) equal to the first voltage or the second voltage, wherein the first voltage is greater than the second voltage.

In addition, in the time periods TP2 to TP4 after the time period TP1, the stylus may sequentially transmit the normal data signals GD1 to GD3. The normal data signals GD1 to GD3 are all periodic signals and have the same first frequency as the reference signal BS. In the present embodiment, the normal data signals GD1 to GD3 and the reference signal BS respectively have different phase differences. For example, the phase of the reference signal BS is 0°, and the phases of the normal data signals GD1 to GD3 may be respectively 90°, 180°, and 270°. The normal data signals GD1 to GD3 may respectively indicate digital codes 10, 00, and 01 (binary), for example. In other embodiments, the data signals GD2 to GD3 do not need to be compared in phase with the reference signal BS. The data signals GD2 to GD3 may be compared with the adjacent previous data signal in phase to obtain the digital codes of the data signals GD2 to GD3.

The above embodiment adopts quadrature phase shift keying (QPSK) for data transmission. The embodiments of the invention are not limited thereto. The digital codes of the data signals GD1 to GD3 also adopt binary phase shift keying (BPSK) for data transmission. Or other related techniques known to those with ordinary knowledge in the art may also be adopted for data transmission, and there is no particular limit.

The above correspondence between the phases of the normal data signals GD1 to GD3 and the digital values indicated may be arbitrarily determined by the designer, and there is no fixed limit. The above description is only an example for illustration, and is not intended to limit the scope of implementation of the invention.

In FIG. 4B, in a data item, the stylus may transmit the reference signal BS in the time period TPI, wherein the reference signal BS is a periodic signal and may have a first frequency and a first phase. In the time period TP1 after the time period TPI, the stylus may transmit the status data signal SPC2, wherein the status data signal SPC2 is also a periodic signal and has a second frequency. In the present embodiment, the first frequency is lower than the second frequency. In the present embodiment, the status data signal SPC2 with a relatively high second frequency may be configured to indicate the button status of the stylus and the host (touch pad), or other types of status data.

In the present embodiment, the frequency of the status data signal SPC2 may be the same as that of the status data signal SPC1 of FIG. 4A. However, the status data signal SPC2 may have a different phase from the status data signal SPC1. In other embodiments of the invention, the frequency of the status data signal SPC2 may be different from that of the status data signal SPC1.

Figure 5:
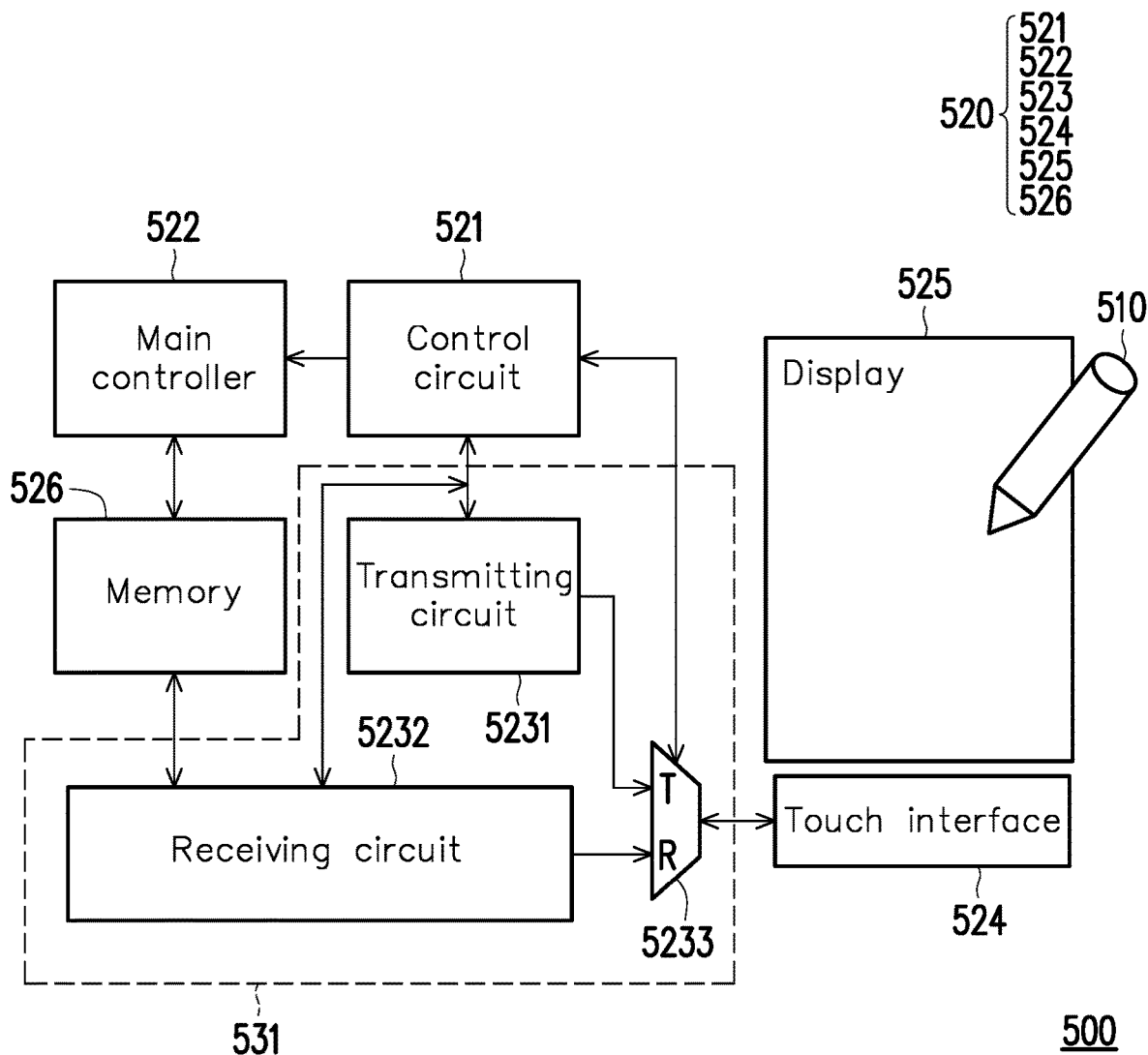
FIG. 5 shows a schematic diagram of a stylus device of an embodiment of the invention.

Referring to FIG. 5, FIG. 5 shows a schematic of a touch control device of an embodiment of the invention. A touch control device 500 includes a stylus 510 and a host 520. The architecture of the stylus 510 is described in detail in the embodiment in FIG. 1, and is not repeated herein. The host 520 includes a control circuit 521, a main controller 522, a transceiver 523, a touch interface 524, a display 525, and a memory 526. The touch interface 524 may be a touch panel. In particular, the display 525 and the touch interface 524 may be integrated with each other to produce a touch display panel. The transceiver 523 is coupled to the touch interface 524, and performs signal transceiving operations via the touch interface 524 and the stylus 510. The control circuit 521 is coupled between the main controller 522 and the transceiver 523. The control circuit 521 may be configured to detect the status data signal and the normal data signal transmitted by the stylus 510. The control circuit 521 may determine the phase of the normal data signal to obtain the normal data of the stylus 510. The control circuit 521 may determine the frequency and the phase of the status data signal to learn one or a plurality of operation statuses of the stylus 510.

The control circuit 521 may transmit the determined operation status of the stylus 510 to the main controller 522. The main controller 522 may perform at least one corresponding application operation according to the obtained operation status.

It should be mentioned that, the memory 526 is coupled to the main controller 522 and the transceiver 523. The memory 526 may be configured to provide any information needed by the main controller 522 and the transceiver 523 to perform any operation.

In the present embodiment, the transceiver 523 includes a transmitting circuit 5231, a receiving circuit 5232, and a selector circuit 5233. The transmitting circuit 5231 is coupled to the control circuit 521 and the selector circuit 5233 and configured to transmit signals to the touch interface 524 and the stylus 510 via the selector circuit 5233. In the present embodiment, the transmitting circuit 5231 may be configured to transmit a request signal to the stylus 510. The receiving circuit 5232 is coupled to the control circuit 521 and the selector circuit 5233, and receives signals transmitted from the stylus 510, such as a plurality of data items, via the selector circuit 5233 and the touch interface 524.

The selector circuit 5233 is coupled to the control circuit 521. The selector circuit 5233 couples the receiving circuit 5232 (via a terminal R) or the transmitting circuit 5231 (via a terminal T) to the touch interface 524 according to an operation mode signal MOD generated by the control circuit 521. The selector circuit 5233 may make the transceiver 523 perform signal transmitting or receiving operations according to the operation mode signal MOD.

In the present embodiment, the control circuit 521 may be a digital circuit and/or an analog circuit of any form, and may perform frequency and phase detection operations for the status data signal and the normal data, and accordingly obtain corresponding data. In addition, the main controller 522 may be implemented using any form of processor with computing capability known to those with ordinary skill in the art, and there is no fixed limit. The memory 526 may be a dynamic random-access memory, a static random-access memory, a non-volatile memory, or a combination of the above memories, and there is no fixed limit. In addition, the transmitting circuit 5231, the receiving circuit 5232, and the selector circuit 5233 may also all be implemented by using related circuits known to those with ordinary skill in the art, and there is no particular limit.

Based on the above, in an embodiment of the invention, in the transmission operation of each data item, the stylus always informs the host of the operation status of the stylus via a status data signal at a frequency different from the normal data signal. In this way, the host may quickly and accurately grasp the operation status of the stylus and may quickly respond to the operations performed by the user on the stylus to enhance user experience.

What is claimed is:
1. A stylus, comprising:
   a transceiver; and
   a controller coupled to the transceiver and generating a plurality of data items based on a request signal received by the transceiver, and generating at least one status data signal in every one of the plurality of data items according to at least one operation status of the stylus,
   wherein, corresponding to each of the plurality of data items, the controller makes the transceiver select at least one selected time period in a plurality of first time periods to transmit the at least one status data signal to a host and transmit at least one normal data signal in at least one other time period other than the at least one selected time period,
   wherein a frequency of the at least one status data signal is different from a frequency of the at least one normal data signal, wherein the controller makes the transceiver transmit a reference signal in a second time period before the plurality of first time periods, and a frequency of the reference signal is equal to the frequency of the at least one normal data signal.

2. The stylus of claim 1, wherein the at least one operation status of the stylus comprises at least one of a hover status, an ink status, a button pressing status, and a power status.

3. The stylus of claim 1, wherein in the at least one status data signal, the at least one status data is located in different selected time periods.

4. The stylus of claim 1, wherein a time length of the at least one selected time period is different from a time length of the at least one other time period.

5. A touch control device, comprising:
a stylus, comprising:
 a first transceiver receiving a request signal; and
 a first controller generating a plurality of data items based on the request signal, and generating at least one status data signal according to at least one operation status of the stylus, wherein in each of the plurality of data items, the first controller selects at least one selected time period of a plurality of first time periods to transmit the at least one status data signal, and transmits at least one normal data signal in at least one other time period other than the at least one selected time period, wherein frequencies of the at least one status data signal and the at least one normal data signal are different; and
a host transmitting the request signal, receiving the plurality of data items, and configured to:
 receive the at least one status data signal of one of the plurality of data items, and detect a frequency and a phase of the at least one status data signal to learn the at least one operation status of the stylus,
 wherein the first controller makes the first transceiver transmit a reference signal in a second time period before the plurality of first time periods, and a frequency of the reference signal is equal to a frequency of the at least one normal data signal.

6. The touch control device of claim 5, wherein the at least one operation status of the stylus comprises at least one of a hover status, an ink status, a button pressing status, and a power status.

7. The touch control device of claim 5, wherein in the at least one status data signal, the at least one status data is located in different selected time periods.

8. The touch control device of claim 5, wherein a time length of the at least one selected time period is the same as or different from a time length of the at least one other time period.

9. The touch control device of claim 5, wherein the host comprises:
a second transceiver configured to transmit the request signal or receive the plurality data items;
a control circuit coupled to the second transceiver, and configured to detect a frequency and a phase of the at least one status data signal to learn the at least one operation status of the stylus; and
a touch interface coupled to the stylus.

10. The touch control device of claim 9, wherein the host further comprises:
a main controller coupled to the control circuit and configured to perform at least one application operation according to the at least one operation status.

11. The touch control device of claim 9, wherein the second transceiver comprises:
a receiving circuit receiving the plurality of data items;
a transmitting circuit transmitting the request signal; and
a selector circuit coupled to the receiving circuit, the transmitting circuit, and the control circuit, and the receiving circuit or the transmitting circuit is coupled to the touch interface according to an operation mode signal.

12. The touch control device of claim 5, wherein the host further comprises a display integrated with a touch interface to form a touch display panel.

* * * * *